United States Patent
Bean

(10) Patent No.: US 7,886,051 B2
(45) Date of Patent: Feb. 8, 2011

(54) ON-LINE WEB TRAFFIC SAMPLING

(75) Inventor: James Bean, Beaverton, OR (US)

(73) Assignee: Webtrends, Inc., Portland, OR (US)

( * ) Notice: Subject to any disclaimer, the term of this patent is extended or adjusted under 35 U.S.C. 154(b) by 0 days.

(21) Appl. No.: 12/548,320

(22) Filed: Aug. 26, 2009

(65) Prior Publication Data

US 2009/0319538 A1 Dec. 24, 2009

Related U.S. Application Data

(63) Continuation of application No. 11/620,427, filed on Jan. 5, 2007, now Pat. No. 7,600,016, and a continuation of application No. 10/086,036, filed on Feb. 27, 2002, now Pat. No. 7,185,085.

(51) Int. Cl.
*G06F 15/173* (2006.01)

(52) U.S. Cl. .............. 709/224; 709/219; 709/223; 709/225; 709/218; 709/203; 709/217; 709/204; 705/10; 705/2

(58) Field of Classification Search ......... 709/217–227, 709/203, 204
See application file for complete search history.

(56) References Cited

U.S. PATENT DOCUMENTS

| | | | |
|---|---|---|---|
| 6,230,153 B1 * | 5/2001 | Howard et al. ............... 1/1 |
| 6,230,204 B1 | 5/2001 | Fleming, III | |
| 6,327,619 B1 | 12/2001 | Blumenau | |
| 6,360,261 B1 | 3/2002 | Boyd et al. | |
| 6,792,458 B1 | 9/2004 | Muret et al. | |
| 6,836,773 B2 | 12/2004 | Tamayo et al. | |
| 6,839,680 B1 | 1/2005 | Liu et al. | |
| 6,925,442 B1 | 8/2005 | Shapira et al. | |
| 7,185,085 B2 * | 2/2007 | Bean ............... 709/224 |
| 7,600,016 B2 * | 10/2009 | Bean ............... 709/224 |
| 2002/0070953 A1 | 6/2002 | Barg et al. | |

FOREIGN PATENT DOCUMENTS

| | | |
|---|---|---|
| WO | WO 01/33470 | 5/2001 |
| WO | WO 01/39012 | 5/2001 |

OTHER PUBLICATIONS

Smith, The Web Bug FAQ Ver 1.0, Article, Nov. 11, 1999, pp. 1-4.
European Patent Office, European Search Report, Oct. 5, 2005.

* cited by examiner

*Primary Examiner*—Jude J Jean Gilles
(74) *Attorney, Agent, or Firm*—Marger Johnson & McCollom, P.C.

(57) ABSTRACT

A method for tracking and reporting traffic activity on a web site first comprises storing a web page on a first server coupled to a network. When the web page is requested from a visitor computer, the visitor computer is selected (or not selected) for inclusion within a sample group, where the sample group is only a subset of the total traffic to the web site. A selection indicator is stored on the visitor computer associated with this selection. Data mining code within the web site is operated or not operated depending upon the value of the selection indicator. The data mining code is operated, and the activity of the visitor computer on the web site consequently tracked only if the visitor computer is selected as a member within the sample group, otherwise the data mining code is not operated and no traffic activity is generated.

20 Claims, 4 Drawing Sheets ary to track and report web-page traffic while
ON-LINE WEB TRAFFIC SAMPLING

CROSS REFERENCE TO RELATED APPLICATIONS

This application is a continuation of U.S. patent application Ser. No. 11/620,427, filed Jan. 5, 2007, which itself is a continuation of U.S. patent application Ser. No. 10/086,036, filed on Feb. 27, 2002, now issued as U.S. Pat. No. 7,185,085, the disclosure of which is herein incorporated by reference.

BACKGROUND OF THE INVENTION

The present application relates to compiling and reporting data associated with activity on a network server and more particularly to compiling only a subset of the potential data to reduce data analysis and reporting hardware needs.

Programs for analyzing traffic on a network server, such as a worldwide web server, are known in the art. One such prior art program is described in U.S. patent application Ser. No. 09/240,208, filed Jan. 29, 1999, issued as U.S. Pat. No. 6,925,442 on Aug. 2, 2005, for a Method and Apparatus for Evaluating Visitors to a Web Server, which is incorporated herein by reference for all purposes. WebTrends, Inc. owns this application and also owns the present provisional application. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc.

Analyzing activity on a worldwide web server from a different location on a global computer network ("Internet") is also known in the art. To do so, a provider of remote web-site activity analysis ("service provider") generates JavaScript code that is distributed to each subscriber to the service. The subscriber copies the code into each web-site page that is to be monitored.

When a visitor to the subscriber's web site loads one of the web-site pages into his or her computer, the JavaScript code collects information, including time of day, visitor domain, page visited, etc. The code then calls a server operated by the service provider—also located on the Internet—and transmits the collected information thereto as a URL parameter value. Information is also transmitted in a known manner via a cookie.

Each subscriber has a password to access a page on the service provider's server. This page includes a set of tables that summarize, in real time, activity on the customer's web site.

The above-described arrangement for monitoring web server activity by a service provider over the Internet is generally known in the art. Examples of the information analyzed includes technical data, such as most popular pages, referring URLs, total number of visitors, returning visitors, etc. The basic mechanism of such services is that each tracked web-site page contains some JavaScript in it that requests a 1×1 image from the service provider's server. Other information is sent along with that request, including a cookie that uniquely identifies the visitor. Upon receipt of the request, applicants' WebTrendsLive service records the hit and stages it for full accounting. This is a proven method for tracking web site usage.

While this mechanism works, it requires increased resources (e.g. bandwidth and processing) for service providers as traffic to it increases.

Accordingly, the need still remains for a way to reduce the resources necessary to track and report web-page traffic while maintaining accuracy in the statistics obtained.

SUMMARY OF THE INVENTION

For very busy sites, it makes sense to sample the traffic rather than record each and every hit. The result is a lower cost of operations.

The foregoing and other objects, features and advantages of the invention will become more readily apparent from the following detailed description of a preferred embodiment of the invention that proceeds with reference to the accompanying drawings.

Figure 2:
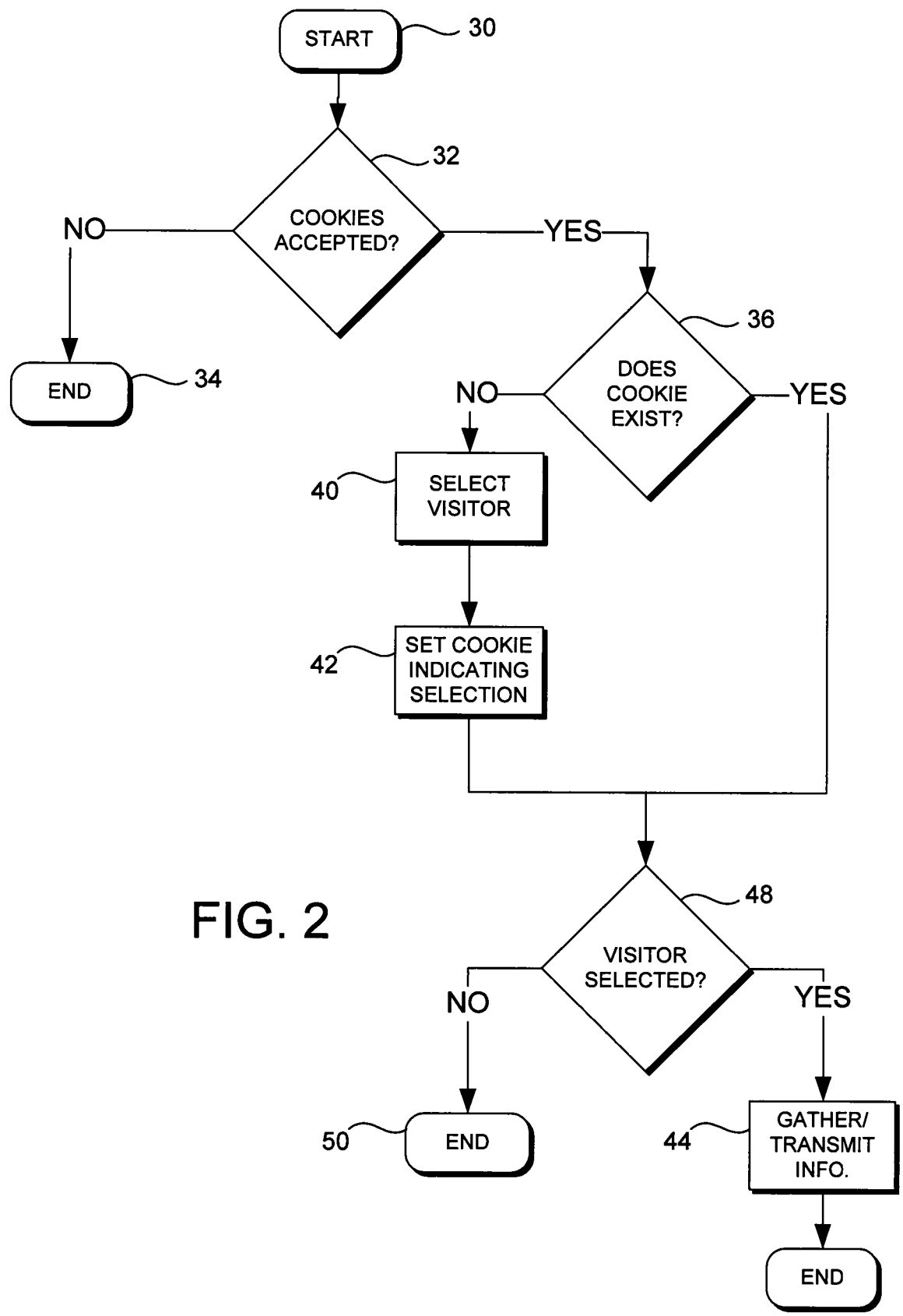
FIG. 2 is a flow diagram illustrating a method for sampling web page traffic according to a preferred embodiment of the invention.

APPENDIX lists a preferred implementation of the code operable to create a sample population per the method shown in FIG. 2.

DETAILED DESCRIPTION

Figure 1:
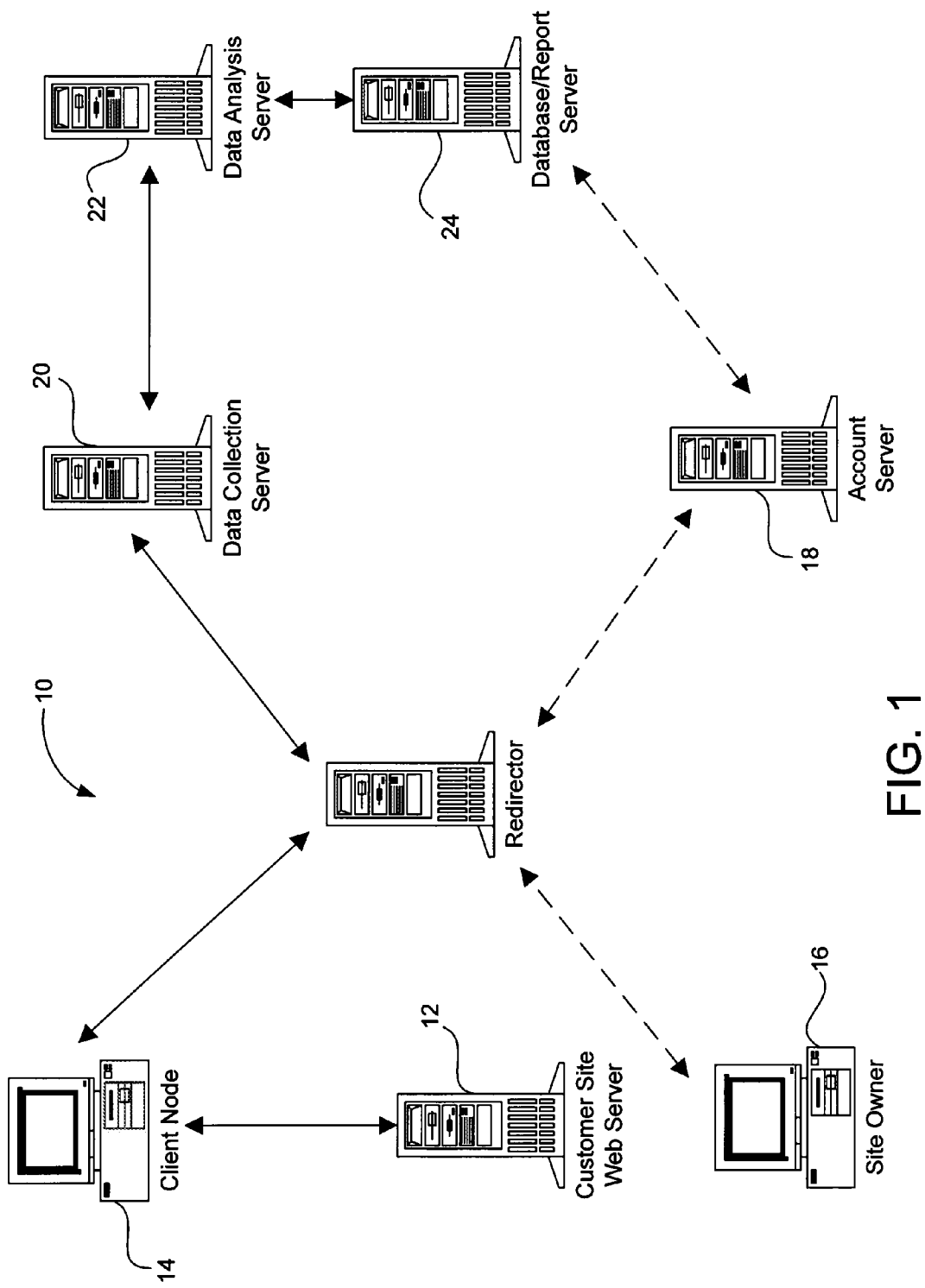
FIG. 1 is a schematic view of a portion of the Internet on which the invention is operated.

Turning now to FIG. 1, indicated generally at 10 is a highly schematic view of a portion of the Internet. FIG. 1 depicts a system implementing the present invention. Included thereon is a worldwide web server 12. Server 12, in the present example, is operated by a business that sells products via server 12, although the same implementation can be made for sales of services via the server. The server includes a plurality of pages that describe the business and the products that are offered for sale that a site visitor can download to his or her computer, like computer 14, using a conventional browser program running on the computer.

As mentioned above, it would be advantageous to the seller to have an understanding about how customers and potential customers use server 12. As also mentioned above, it is known to obtain this understanding by analyzing web-server log files at the server that supports the selling web site. It is also known in the art to collect data over the Internet and generate activity reports at a remote server.

When the owner of server 12 first decides to utilize a remote service provider to generate such reports, he or she uses a computer 16, which is equipped with a web browser, to visit a web server 18 operated by the service provider. On server 18, the subscriber opens an account and creates a format for real-time reporting of activity on server 12.

To generate such reporting, server 18 provides computer 16 with a small piece of code, typically JavaScript code (data mining code). The subscriber simply copies and pastes this code onto each web page maintained on server 12 for which monitoring is desired. When a visitor from computer 14 (client node) loads one of the web pages having the embedded code therein, the code passes predetermined information from computer 14 to a server 20—also operated by the service provider—via the Internet. This information includes, e.g., the page viewed, the time of the view, the length of stay on the page, the visitor's identification, etc. Server 20 in turn transmits this information to an analysis server 22, which is also maintained by the service provider. This server analyzes the raw data collected on server 20 and passes it to a database server 24 that the service provider also operates.

When the subscriber would like to see and print real-time statistics, the subscriber uses computer 16 to access server 18, which in turn is connected to database server 24 at the service provider's location. The owner can then see and print reports, like those available through the webtrendslive.com reporting service operated by the assignee of this application, that provide real-time information about the activity at server 12.

The data mining code embedded within the web page script operates to gather data about the visitor's computer. Also included within the web page script is a request for a 1×1 pixel image whose source is server 20. The 1×1 pixel image is too small to be viewed on the visitor's computer screen and is simply a method for sending information to server 20, which logs for processing by server 22, all web traffic information.

The data mined from the visitor computer by the data mining code is attached as a code string to the end of the image request sent to the server 20. By setting the source of the image to a variable built by the script (e.g. www.webtrendslive.com/button3.asp?id39786c45629t120145), all the gathered information can be passed to the web server doing the logging. In this case, for instance, the variable script "id39786c45629t120145" is sent to the webtrendslive.com web site and is interpreted by a decoder program built into the data analysis server to mean that a user with ID#39786, loaded client web site #45629 in 4.5 seconds and spent 1:20 minutes there before moving to another web site.

Another method for tracking visitors to a web site is through the use of objects called "cookies." A cookie is a piece of text that a web server can store on a user's hard disk. Cookies allow a web site to store information on a user's machine and later retrieve it. The pieces of information are stored as "name-value pairs" comprised of, for instance, a variable name (e.g. UserID) and a value (e.g. A9A3BECE0563982D) associated with that variable name.

Taking the web browser Microsoft Internet Explorer as an example, cookies are typically stored on a machine running Window 9x in a directory called c:\windows\cookies. The directory may list a vast number of name-value pairs, each associated with a particular domain from which they originated, representing all of the web sites that has placed a cookie on that particular computer. An example of a cookie file is shown below:

UserID A9A3BECE0563982D www.netiq.com/

The cookie above is typical of the type stored on a visitor's computer (hereinafter the client node) when visiting the web site located at the domain netiq.com. The name of the name-value pair is UserID, and the value is A9A3BECE0563982D. Both the name and value of the pair are generated according to an algorithm programmed in the cookie server associated with the domain web site. The first time the client node browses the netiq.com web site, software on that web site assigns a unique ID number for each visitor and instructs the browser on the client node to store the name-value pair as a cookie in a designated folder where it can be retrieved later. The same name-value pair data is stored on the netiq.com cookie server (such as customer server 12) along with other information so that the visitor can be identified later.

Cookies operate according to an industry standard called "Cookie RFC" (request for comment).

A more complicated example of a cookie is shown below in reference to the eCommerce web site amazon.com. Visits to the amazon.com web site result in the storage of a more comprehensive set of information on the client node visiting the web site. The resulting cookie from such a visit is comprised of the following "crumbs":

Session-id-time 954242000 amazon.com/
Session-id 002-4135256-7625846 amazon.com/
x-main eKQIfwnxuF7qtmX52x6VWAXh@ih6Uo5H amazon.com/
ubid-main 077-9263437-9645324 amazon.com/

Each of these portions of the cookie, or "crumbs", is associated with the amazon.com domain. Based on these crumbs, it appears that amazon.com stores a main user ID, an ID for each session, and the time the session started on the visitor computer (as well as an x-main value, which could be anything). While the vast majority of sites store just one piece of information—a user ID—on a visitor computer, there is really no limit to the amount of information such sites can store on the visitor computer in name-value pairs.

A name-value pair is simply a named piece of data. It is not a program, and it cannot "do" anything. A web site can retrieve only the information that it has placed on the client node computer. It cannot retrieve information from other cookie files, or any other information from your machine.

The data moves in the following manner. If one were to type the URL of a web site into a computer browser, the browser sends a request to the web site for the page. For example, if one were to type the URL http://www.amazon.com into the browser, the browser will contact Amazon's server and request its home page. When the browser does this, it will look on the requesting machine for a cookie file that Amazon has set. If it finds an Amazon cookie file, the browser will send all of the name-value pairs in the file to Amazon's server along with the URL. If it finds no cookie file, it will send no cookie data. Amazon's web server receives the cookie data and the request for a page. If name-value pairs are received, Amazon can use them.

If no name-value pairs are received, Amazon knows that the visitor operating that computer has not visited before. The server creates a new ID for that visitor in Amazon's database and then sends name-value pairs to the computer in the header for the web page it sends. The computer stores the name-value pairs on its hard disk drive according to the Cookie RFC protocol.

The web server can change name-value pairs or add new pairs whenever you visit the site and request a page.

There are other pieces of information that the server can send with the name-value pair. One of these is an expiration date. Another is a path so that the site can associate different cookie values with different parts of the site.

Cookies evolved because they solve a big problem for the people who implement web sites. In the broadest sense, a cookie allows a site to store state information on a visitor's computer. This information lets a web site remember what state the browser is in. An ID is one simple piece of state information—if an ID exists on the visiting computer, the site knows that the user has visited before. The state is, "Your browser has visited the site at least one time," and the site knows the user ID from that visit.

Web sites conventionally use cookies in many different ways. For instance, sites can accurately determine how many readers actually visit the site, which are new as opposed to repeat visitors, and how often each visitor has visited the site. It turns out that because of proxy servers, caching, concentrators and so on, the only way for a site to accurately count visitors is to set a cookie with a unique ID for each visitor. The way the site does this is by using a database. The first time a visitor arrives, the site creates a new ID in the database and sends the ID as a cookie. The next time the user comes back, the site can increment a counter associated with that ID in the database and know how many times that visitor returns.

Sites can also store user preferences so that the site can look different for each visitor (often referred to as customization). For example, if one were to visit msn.com, it offers the visitor the ability to change content/layout/color. It also allows one to enter a zip code and get customized weather information. When the zip code is entered, the following name-value pair is an example of what might be added to MSN's cookie file:
WEAT
CC=NC%5FRaleigh%2DDurham®ION=www.msn.com/

It is apparent from this name-value pair that the visitor is from Raleigh, N.C. Most sites seem to store preferences like this in the site's database and store nothing but an ID as a cookie, but storing the actual values in name-value pairs is another way to do it.

ECommerce Sites can implement things like shopping carts and "quick checkout" options. The cookie contains an ID and lets the site keep track of a visitor as the visitor adds different things to his or her "shopping cart." Each item added is stored in the site's database along with the visitor's ID value. When the visitor checks out, the site knows what is in his or her cart by retrieving all of the selections from the database associated with that user or session ID. It would be impossible to implement a convenient shopping mechanism without cookies or something like it.

In all of these examples, note that what the database is able to store is things the visitor has selected from the site, pages viewed from the site, information given to the site in online forms, etc. All of the information is stored in the site's database, and a cookie containing your unique ID is all that is stored on the client node 14 (FIG. 1) in most cases. Both the image request method, and the cookie method, result in each and every web-page visit be reported—a result that can overwhelm the data collection server 20.

To address this drawback, the present invention operates by sampling only a portion of the data. In the preferred embodiment, the data mining code operates to return traffic data to the data collection server 20 for only a random subset of the computers and/or visitors visiting a web site. This is herein referred to as "sampling."

The theory of sampling is that by accounting for a random subset of the whole population, the actual numbers can be extrapolated with high confidence. For sampling web traffic, it is preferable to sample visitors, not hits or visits. If visits or hits are sampled, inaccuracies can arise. For example, if hits are sampled, then the paths through sites are distorted in a way that cannot be reconstructed. Also, some visits would be completely unaccounted for (those who had all of their hits not chosen), whereas other visits are still counted as visits, though perhaps with fewer hits, and there is no easy way to correct for this. The same kinds of problems arise with sampling visits. Therefore, it is preferred to sample visitors, though it is not central to the idea of this invention.

To reap the most benefit from sampling, it is preferred that the sampling be performed on the client machine. This is important because it does the best job of reducing the traffic from the client 14 to the service provider 20 as early as possible, thus minimizing the resources required to handle that traffic.

FIG. 2 is a flow diagram illustrating the preferred method for sampling data on a visitor computer 14. The process begins in block 30 where a web page request has been initiated at the client node 14 and the web-page address (URL) and cookie (if any) associated with that address are sent out through the world-wide network. The request is routed through the world-wide network 10 to the customer web site 12, and the requested web page and attached data mining code is forwarded from the site 12 to the client node 14 responsive to the request.

The method then proceeds to query block 32 in which it is determined whether cookies can be stored on the client node 14. Conventional browsers offer security features that allow users to block cookies from being stored on their computer. If this feature is turned on, then no cookies can be accepted and the method proceeds to block 34 where the process ends. Because users who elect to block cookies form a definite subset of the computer user population, it is preferred that such users be excluded from the data sampling operating since, otherwise, such a population could skew the normalized traffic statistics.

An alternate path flow is to not determine whether cookies are enabled or not. Rather, query block 32 would not exist and the method would simply proceed to query block 36 and thence to blocks 40 and 42. Users who deny the cookie will go through the selection routine every visit—but since the cookie can never be written to or stored on the visitor computer, the code will never execute.

Included with the web page is the data mining code that includes cookie processing script. A portion of the script, used to implement the method shown in FIG. 2, is listed in APPENDIX. Line number 33 of APPENDIX includes the command that selectively executes the data tracking function of the remainder of the data mining code. In the code shown, the data mining code will execute if the "track" value maintained within a cookie stored on the visitor's computer is "true", otherwise the data mining code will not operate on the client node 14. As stated above, the data mining code typically includes an image request function that attaches relevant data to the request, which is forwarded to a service provider data analysis server 20. The returned image is only 1×1 pixel in size and is thus too small to see. Other known methods create an image object that is never actually written to the screen and thus is not size-limited.

If it is determined in query block 32 that cookies can be stored on the visitor's computer, then the method proceeds to query block 36. For new visitors to a particular site, no cookie associated with the site being tracked will typically exist on the client node 14. The cookie must then be created in block 42, as by first operating the JavaScript code contained in lines 1-7 in APPENDIX to set a random value and then, in line 17 compare the random value to a sample interval set by the web site owner to select the visitor in block 40. The interval number can be set to any whole number, but is most preferably set to 10 (or 100) so that one-in-ten (or one-in-a-hundred) of the visitors to the site cause the cookie "track" value to be set to "true" in block 42 and thus operate the data mining code in block 44.

Once the tracking cookie is set (or already exists) within the visitor profile on client node 14, then that cookie is read in block 46 and queried in block 48 to determine whether the client node is to be tracked (as by operating block 44) or not. If the cookie "track" value is set to "false", as in code line 24 in APPENDIX, then the method proceeds to block 50 where the tracking process ends. The if-else statement shown in lines 27-30 of the APPENDIX script results in a "track=true" setting for all circumstances where "track" does not equal true. One such circumstance where "track=false" is the browser on visitor computer 14 is set to block cookies so that no cookies can be set and stored on that computer.

If the cookie "track" value is instead set to "true", then the data mining code is operated in block 44 to gather the visitor traffic data (e.g. the page viewed, the time of the view, the length of stay on the page, the visitor's identification, etc.), which is then transmitted to the data collection server 20 of the service provider utilizing the present invention.

A sample name-value pair cookie that is set according to the present invention may be stored on the visitor computer, within a user profile associated with the visitor operating the client node 14, as follows:

track_true_localhost/battlebots/_0_1452168960_
29502115_2223297120_29465905_* where the cookie lists the tracking setting as set to "true", the tracking domain (battlebots), and the associated tracking values for that domain.

Because the data is sampled, the data actually received by data collection server 20 and passed to data analysis server 22 must be normalized to account for the fact that only a fraction of the actual visitors to a web site are being tracked. If, in line 17 of the sample JavaScript programming code shown in APPENDIX implementing the invention, the value of variable wtl_sampleinterval is set to '10', then only approximately one in ten visitors are counted. Consequently, the data of actual visitors to the site must be multiplied by a factor of ten so that a very close approximation of the actual visitors to the site is reflected in the reports generated by database/report server 24. If variable wtl_sampleinterval is set to '100', then only approximately one in a hundred are counted and the normalizing multiplier is 100×. It is understood, therefore, that the product of the sample interval and the normalizing multiplier equals one.

In summary, the process for Client-Side Sampling is implemented as follows according to a first embodiment of the invention:

1. The JavaScript executing on the client machine determines whether or not to execute the tracking functionality (based on some random criteria).
2. The JavaScript sets a cookie for the site on the client's machine, indicating whether or not the visitor is included in the sample population.
3. Each time the JavaScript is invoked, it checks the sampling cookie to see if it should report the client's traffic to the service provider.

Although the cookie is described above as being set and stored on the client machine, those skilled in the art would recognize that the invention is not so limited. Many modern networked computers operate under the principal of "profiles" where each user within a network has their own settings stored on the network. Logging on to any computer on the network causes the profile (typically stored on a central server within the LAN) to be uploaded to that computer. Cookie values for the person logging in are included within that profile. Thus, the cookie "track" value (also referred to herein as the selection indicator) is capable of following the visitor no matter which workstation the visitor happens to be using at the time. Similarly, a single client node computer 14 may host several visitors where some are selected for inclusion within the tracking subset and others are not. Accordingly, the term "visitor computer" or "client computer" is not intended to be limited to any single machine but rather could encompass selection of the machine itself and/or the visitor currently operating the machine.

Pure Client-Side Sampling is not required, however. In a second embodiment of the invention, the service provider's servers (or those hosting the web site) are minimally involved to set the sample "track" value of the cookie for new visitors:

i. The JavaScript looks for a local cookie. If no such cookie exists, the JavaScript makes a request to the service, e.g. an image request to data collection server 20.
ii. The service identifies new users—and randomly selects the visitor for tracking. The result of that selection is passed back to the JavaScript on the client via the image size and/or color. For example, a 1×1 image might indicate that the visitor is to be tracked, while a 1×2 image indicates that the visitor is not to be tracked. Similarly, a black pixel image might represent "track=true" while a white pixel represents "track=false". The cookie value and the return image interpretation are considered examples of "selection indicators."
iii. Based on the returning image size/color—the JavaScript then sets a local cookie containing the tracking selection value (e.g. "true" or "false").

Figure 3:
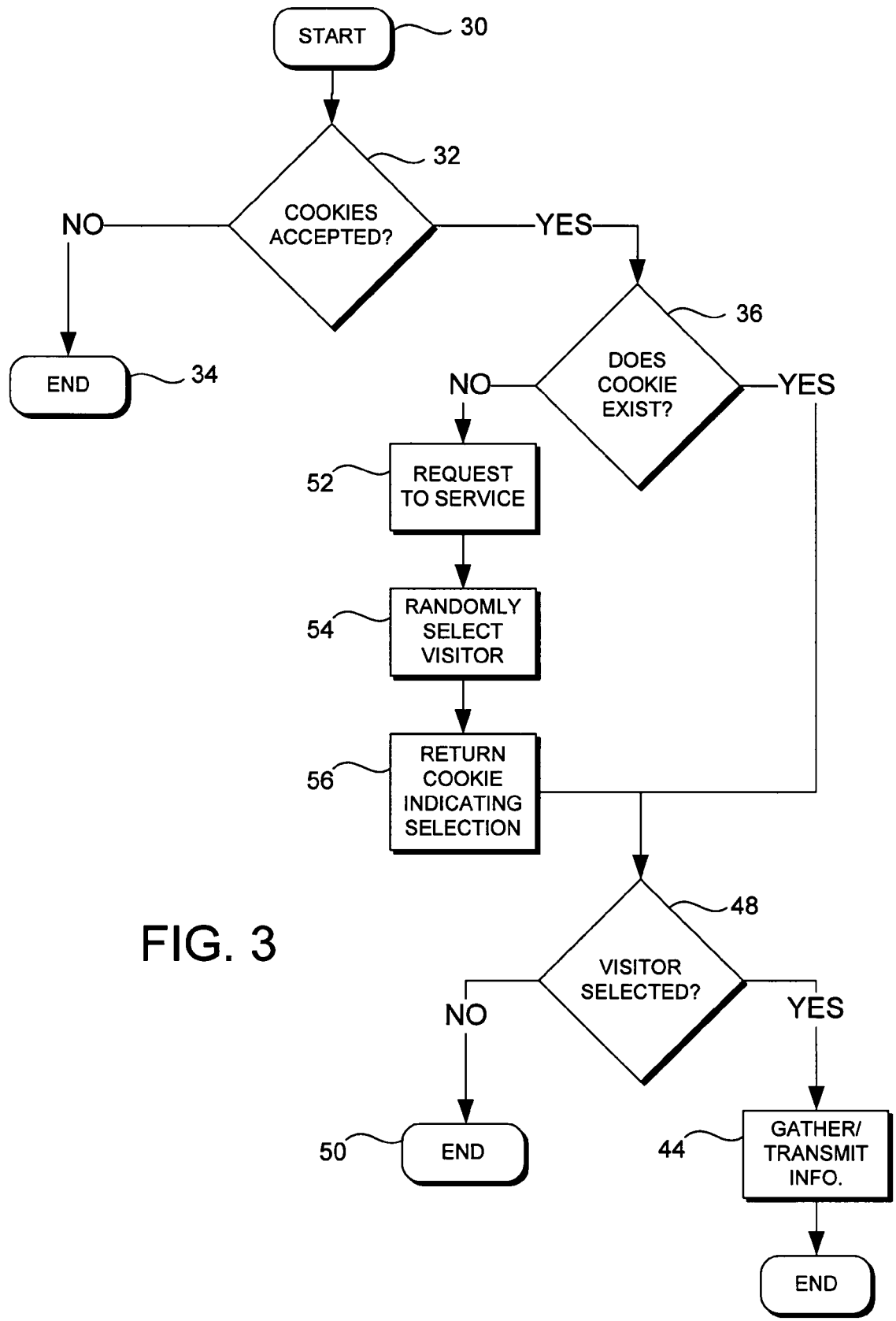
FIG. 3 is a flow diagram illustrating a method for sampling web page traffic according to an alternate embodiment of the invention.

A flow diagram implementing the second method for sampling is shown in FIG. 3. The process proceeds similarly to that shown in FIG. 2 for pure client-side sampling, whereby the process starts in block 30 with a request for a web page. If in query block 32 it is determined that the computer browser is set so that no cookies are accepted, then the process ends in block 34 and the visitor is not tracked. If it is determined that cookies are accepted in query block 32, and that a cookie exists in query block 36, then the cookie "track" value is read and, if "track=true" then query block 48 proceeds to block 44 in which the JavaScript data mining code embedded within the returned web page gathers data about the visitor and transmits the information to the data gathering server 20. If "track=false" then query block 48 proceeds to block 50 in which the JavaScript data mining code embedded within the returned web page is ignored and no traffic information is returned to the data gathering server 20.

If instead in query block 36 it is determined that a cookie does not exist on the machine (e.g. that the visitor is new to the site, the cookie has expired or cookies cannot be stored), then the process proceeds to block 52 which implements a request to the service provider for a tracking select cookie. Code stored within the server operates in a similar manner to the script shown in APPENDIX to randomly select visitors in block 54, as by generating a random number, comparing the randomly generated number to a sample ratio, and returning a cookie to the visitor computer 14 indicating whether the visitor is selected ("track=true") or not ("track=false"). Subsequent visits by the visitor to the web site will result in the newly stored cookie being read, in query block 48, and the data mining code operated or not operated according to the cookie "track" setting.

Again, the process flow can be configured so that blocks 32 and 34 do not exist. Instead, rather the cookie will never be capable of being stored and thus does not "exist" for the purposes of query block 36—thus, the process will implement the selection routine in blocks 52, 54 and 56 every time for that visitor computer, the cookie set but never stored, and thus no "true" value read in query block 48 to cause the data mining code to execute in block 44.

One can imagine sampling the visits or the visitors. In visit sampling, the cookie expiration is set to a relatively short term, such as 30 minutes, to reflect that a user typically spends less than that period of time at the site during any one visit. If the cookie has expired, it is then assumed that the user is initiating a subsequent visit to the web site independent of the earlier one. By storing a local cookie and updating it on each request, visit sampling can be done by setting the cookie expiration. If there is a lapse of 30 minutes, the cookie expires and a new session is created.

Under visitor sampling which is the preferred method for sampled tracking, the cookie expiration is set to a relatively long term, such as 3 months, to track a single user over multiple site visits. By storing a local cookie—visitor sampling can be done by setting a permanent, or long term, cookie. The visitor then retains that setting for future sessions.

An example of a JavaScript subroutine that sets the cookie expiration data at 180 days is shown by the following code:

```
var exp = new Date( )
var newexp = exp.getTime( ) + (86400000 * 180)
exp.setTime(newexp)
document.cookie = cval + ";expires=" + exp.toGMTString( );
```

In both the methods shown in FIGS. 2 and 3, the data mining JavaScript code is transmitted with the requested web page whether the visitor is to be tracked or not. Although the data mining code is typically small relative to the code implementing the web page, this creates inefficiencies in that data is being transmitted that will not be used. Preventing that code from being transmitted in the first place would then reduce the bandwidth requirements for serving the web site.

Figure 4:
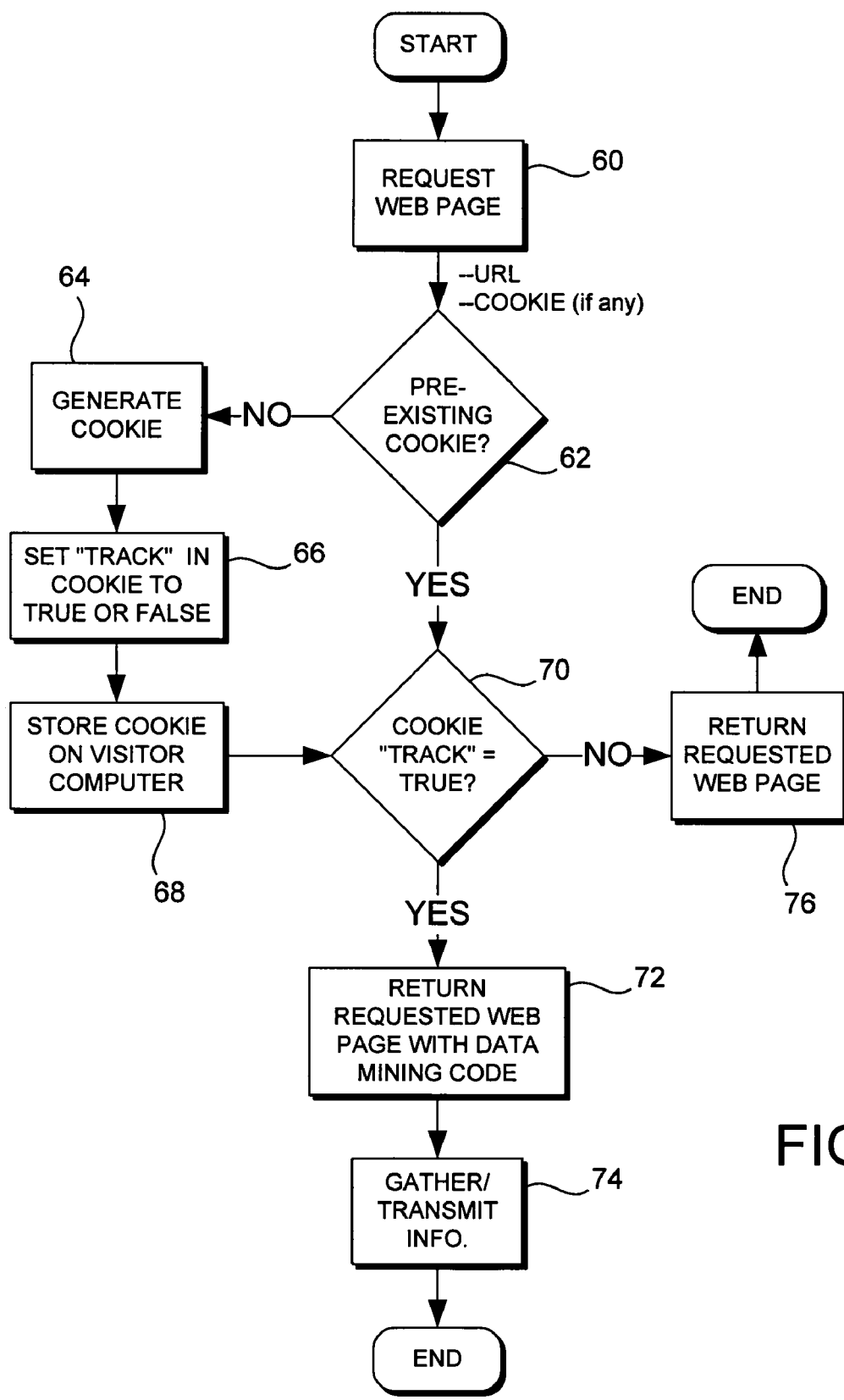
FIG. 4 is a flow diagram illustrating a method for sampling web page traffic according to a second alternate embodiment of the invention.

FIG. 4 illustrates a method for implementing a feature whereby the data mining code is conditionally included in the data sent to the visitor computer 14 for operating on that computer's web browser. The process starts in block 60 with a request by the visitor computer 14 of a web page. The request results in, among other data, a URL identifying the web page and a cookie associated with the URL being sent throughout the worldwide network 10. The request is routed through the worldwide network and received at the customer site web server 12. Query block 62 operating within web server 12 determines whether a cookie accompanied the request. If not, then the process proceeds to block 64 in which a cookie is generated, block 66 where the cookie "track" value is set to true or false according to some algorithm such as those described above, and block 68 where the cookie (including "track" value) is sent back to the visitor computer for storage.

If the newly created cookie, or a preexisting one includes a "track" value that is set to true, then the requested web page is returned to the visitor computer with the data mining code appended in block 72. The data mining code, when operated by the visitor computer's browser, then gathers the data in block 74 and transmits it to the tracking server 20 as by known means. If the cookie "track" value is not set to "true" (e.g. it is instead set to false), then the process proceeds to block 76 where only the requested web page is returned from customer site server 12 to visitor computer 14—the data mining code is not appended.

Code for the Server Side Include may be configured as follows:

```
<%if not request.cookies("track") = "false" then%>
    <!-- #Include Virtual="/includes/trackingcode.inc"-->
<%end if%>
``` which operates so that an ISS webserver would include the data mining code within the source web page of an Active Server Page if a cookie has not been successfully set to "track=false."

Having described and illustrated the principles of the invention in a preferred embodiment thereof, it should be apparent that the invention can be modified in arrangement and detail without departing from such principles. I claim all modifications and variation coming within the spirit and scope of the following claims.

APPENDIX

```
 1 function ExecuteLoad( )
 2 {
 3     function rand(number)
 4     {
 5         rand.today=new Date( );
 6         rand.seed=rand.today.getTime( );
 7         return (Math.floor (Math.random( ) * number) + 1);
 8     }
 9
10     // decide if we are tracking this visitor
11     // first, look for a cookie to tell us
12
13     var cval = GetCookie("track")
14     if(cval == "" || cval == null)
15     {
16         // no cookie, randomly choose
17     checkme = rand(wtl_sampleinterval)
18
19         // set cookie
20
21         if(checkme == wtl_sampleinterval)
22             SetCookie("track=true")
23         else
24             SetCookie("track=false")
25     }
26
27     if(GetCookie("track") == "true")
28         return true
29     else
30         return false
31 }
32
33 if(ExecuteLoad( ) == true)
34 {
35     // do all the normal tracking stuff here...
36 }
```

The invention claimed is:

1. A method for tracking and reporting traffic activity on a website from a subset of total visitors to the web site, comprising:

receiving data mining code at a plurality of visitor computers responsive to visits by the visitor computers to a web site;

operating the data mining code on the visitor computers; and for only a subset of the total number of visitor computers who visited the web page, returning tracking activity from the subset of visitor computers to a tracking computer over a network responsive to a communication from a server over the network, otherwise not returning tracking activity to the tracking computer from the visitor computers outside of the subset.

2. The method of claim 1, further including the step of normalizing the tracking activity received from the subset of total number of visitor computers.

3. The method of claim 2, wherein the step of normalizing includes:

setting a normalization multiplier in accordance with a ratio between the subset and a total of the plurality of computers visiting the web site;

normalizing the traffic activity by the normalization multiplier; and posting a report including the normalized traffic activity for viewing over the network.

4. The method of claim 1, wherein the step of receiving data mining code at a visitor computer includes:

receiving data mining code at only the subset of visitor computers and not those outside the subset; and operating the data mining code at only the subset.

5. The method of claim 1, further including the step of generating a selection indicator indicating either inclusion or non-inclusion within the subset, wherein the step of generating the selection indicator is performed on the visitor computer via cookie processing script included within a web page of the web site being tracked and downloaded by the visitor computer.

6. The method of claim 1, further including:

storing cookie processing script on a second server remote from said web site;

receiving a request from the visitor computer at the second server initiated by code included within a web page of the web site visited;

operating the cookie processing script responsive to the request to generate a selection indicator; and returning the selection indicator to the visitor computer for storage.

7. The method of claim 1, wherein the first server includes cookie processing script, the method further including the steps of:

serving a request from the visitor computer of a web page;

operating the cookie processing script responsive to a request to generate a selection indicator; and returning the selection indicator to the visitor computer for storage.

8. The method of claim 1, wherein the step of receiving data mining code at the plurality of visitor computers responsive to visits by the visitor computers to a web site occurs in a separate step than a step of receiving the web page at the visitor computer.

9. The method of claim 8, wherein the step of receiving data mining code is triggered by a request for the data mining code embedded within code of the web site.

10. The method of claim 1, further including the steps of:

generating a selection indicator indicating either inclusion or non-inclusion within the subset; and operating the data mining code on the visitor computer to obtain web browsing data responsive to a value of the selection indicator.

11. A method for tracking and reporting traffic activity to a web resource from a subset of total visitors to the web site, comprising:

receiving data mining code at a plurality of visitor computers responsive to visits by the visitor computers to a web resource;

operating the data mining code on the visitor computers; and for only a subset of the total number of visits to the web page, returning tracking activity from the subset of visits to a tracking computer over a network responsive to a communication from a server over the network, otherwise not returning tracking activity to the tracking computer from the visitor computers outside of the subset of visits.

12. The method of claim 11, further including the step of normalizing the tracking activity received from the subset of total number of visitor computers.

13. The method of claim 12, wherein the step of normalizing includes:

setting a normalization multiplier in accordance with a ratio between the subset and an approximate total of the plurality of visits from said visitor computers;

normalizing the traffic activity by the normalization multiplier; and posting a report including the normalized traffic activity for viewing over the network.

14. The method of claim 11, wherein the step of receiving data mining code at a visitor computer includes receiving data mining code at only the subset of visitor computers and not those outside the subset of visits and operating the data mining code at only the subset.

15. The method of claim 11, further including the step of generating a selection indicator indicating either inclusion or non-inclusion within the subset, wherein the step of generating the selection indicator is performed on the visitor computer via cookie processing script included within a web page of the web resource being tracked and operated by the visitor computer.

16. The method of claim 11, further including:

storing cookie processing script on a second server remote from said web site;

receiving a request from the visitor computer at the second server initiated by code included within a web page of the web site visited;

operating the cookie processing script responsive to the request to generate a selection indicator; and returning the selection indicator to the visitor computer for storage.

17. The method of claim 11, wherein the first server includes cookie processing script, the method further including the steps of:

serving a request from the visitor computer of a web page;

operating the cookie processing script responsive to a request to generate a selection indicator; and returning the selection indicator to the visitor computer for storage.

18. The method of claim 11, wherein the step of receiving data mining code at the plurality of visitor computers responsive to visits by the visitor computers to a web site occurs in a separate step than a step of receiving the web page at the visitor computer.

19. The method of claim 18, wherein the step of receiving data mining code is triggered by a request for the data mining code embedded within code of the web site.

20. The method of claim 11, further including the steps of:

generating a selection indicator indicating either inclusion or non-inclusion within the subset; and operating the data mining code on the visitor computer to obtain web browsing data responsive to a value of the selection indicator.

* * * * *